United States Patent [19]

Neely et al.

[11] 3,798,042

[45] Mar. 19, 1974

[54] REFRACTORY SHAPE WITH PREREACTED GRAIN

[75] Inventors: Joseph E. Neely, Los Gatos; Sidney F. Brown, Milpitas, both of Calif.

[73] Assignee: Kaiser Aluminum & Chemical Corporation, Oakland, Calif.

[22] Filed: Oct. 17, 1972

[21] Appl. No.: 298,442

[52] U.S. Cl. .................................................. 106/59
[51] Int. Cl. ...................... C04b 35/24, C04b 35/42
[58] Field of Search ....................................... 106/59

[56] References Cited
UNITED STATES PATENTS 3,180,743  4/1965  Davies et al. .......................... 106/59
3,180,745  4/1965  Davies .................................. 106/59

*Primary Examiner*—James E. Poer
*Attorney, Agent, or Firm*—Paul E. Calrow; Malcolm McQuarrie

[57] ABSTRACT

A refractory shape exhibiting physical and chemical stability, good high temperature strength, reduced firing shrinkage, and improved thermal shock resistance is made from an admixture of periclase refractory grain, refractory chrome ore grain, and a prereacted chrome-magnesia grain made by reacting a finely divided admixture of magnesia-yielding material and refractory chrome ore material at elevated temperatures.

15 Claims, No Drawings

REFRACTORY SHAPE WITH PREREACTED GRAIN

BACKGROUND OF THE INVENTION

It has long been known to make refractory shapes from admixtures of periclase and chrome ore in various proportions. Even when such shapes have been fired before being placed in a furnace structure, the thermochemical reactions between the periclase and chrome materials are incomplete, with the result that such brick tend to undergo further thermochemical reactions in service. These can lead to either shrinkage or growth of a refractory shape, depending on the particular service conditions. For example, it is well known that chrome-containing refractories can undergo marked expansion when they are subjected to an alternating heating and cooling cycle concurrent with alternating oxidizing and reducing conditions. The continued reaction between periclase and chrome ore in these bricks takes place even under less drastic environmental conditions.

It has been proposed to overcome this problem by prereacting periclase or magnesia material with chrome ore, for example by making a prereacted grain as disclosed in U.S. Pat. Nos. 2,775,525 and 2,775,526. The making of a refractory shape from prereacted grain is disclosed in U.S. Pat. No. 3,577,246. However, it has been found that such refractory shapes made from prereacted grain exhibit undesirable sensitivity to thermal shock, and also do not have as high strength at elevated temperatures as is desirable. In addition, the brick made substantially entirely from prereacted grain exhibit an undesirably high amount of shrinkage during firing. Also, additions of $Al_2O_3$ to the brick batch are required to achieve high strength at elevated temperatures. It is believed that this addition may contribute to the brick's thermal shock sensitivity.

It has also been proposed to make refractory shapes by fusing together a mixture of magnesia and chrome ore, crushing the resulting fusion after cooling to form refractory grain, and rebonding this fused grain into a brick shape. However, again these rebonded fused grain brick exhibit very poor thermal shock resistance, and their strength at high temperatures is lower than desired.

It has been proposed to make refractory shapes from admixtures of sintered prereacted grain together with periclase or chrome ore additions. However, such brick have proved unstable from the thermochemical point of view when placed in service, probably because it has been customary to use a relatively coarse chrome ore in making the prereacted grain, for example as disclosed in U.S. Pat. Nos. 3,180,743 and 3,429,723.

Finally, it has been proposed to make refractory shapes from admixtures of fused grain, periclase, and chrome ore, for example as disclosed in U.S. Pat. Nos. 3,210,206 and 3,589,919. However, again such shapes do not exhibit as high a strength at elevated temperatures as is desirable in some applications.

Accordingly, the refractories industry is still looking for a refractory shape based on periclase and chrome ore material which has good thermochemical stability in service, which has a reasonable thermal shock resistance, and which exhibits high strength at elevated temperatures. It is to the solution of this problem that the present invention is directed.

SUMMARY OF THE INVENTION

According to the present invention, a fired refractory shape is made from a batch consisting essentially of from about 20 percent to about 80 percent prereacted grain, the balance being from 0 percent to 55 percent unreacted periclase and from 0 percent to 55 percent unreacted chrome ore, said prereacted grain being a sintered admixture of from 20 percent to 80 percent magnesia and from 80 percent to 20 percent chrome ore, both materials substantially entirely passing a 100 mesh screen, the sintered grain being substantially free of any unreacted chrome particles, all percentages being by weight.

DETAILED DESCRIPTION

The prereacted grain is made by admixing and firing fine magnesia and fine chrome ore. Both materials substantially entirely pass a 100 mesh screen, and preferably at least 90 percent of each of them passes a 325 mesh screen. The term magnesia includes not only MgO, but also material such as magnesium hydroxide and magnesium carbonate which, upon heating, would yield MgO. While a deadburned magnesia such as the periclase used in conjunction with the prereacted grain in the practice of this invention, can be used, it is generally more economical to use a more lightly burned magnesia. The chrome ore can be any such material and, where it is desired to limit the $SiO_2$ content of the refractory, the beneficiated type of chrome ore sometimes referred to as chrome concentrates can be used. The magnesia and chrome ore can be mixed as a slurry or wet sludge and charged directly to a rotary kiln for firing, for example at temperatures of about 1,900° to 2,000°C or higher. Alternatively, the materials can be compacted prior to firing.

The prereacted grain, after firing, shows complete reaction between the periclase and chrome ore. In other words, the prereacted grain is substantially free of any of the original chrome particles, these all having reacted with the periclase at high temperatures to form a solid solution from which chrome spinels are exsolved during cooling. The very fine raw materials and the complete reaction between them in forming the prereacted grain are characteristics of the present invention.

The unreacted periclase or magnesia grain may be any deadburned refractory magnesia material, for example deadburned magnesite, containing 85 percent or more MgO. The invention is particularly advantageous when the magnesia grain is a synthetic periclase grain, for example one made by reacting sea water or inland brines with lime-containing material, and is most particularly useful with synthetic periclase containing at least 95% MgO. The magnesia grain is prepared by any of various methods well known in the art.

The unreacted chrome ore may be any chrome ore, but again the invention is especially advantageous when the chrome ore is a beneficiated chrome ore, known in the industry as chrome concentrates. Chrome concentrates are chrome ore which has been beneficiated to remove a substantial proportion of the low melting silicate gangue material, thus providing a more refractory, low silica material. For example, Masinloc chrome concentrates are known to contain 3 percent or less $SiO_2$, while certain Transvaal concentrates can contain less then 1% $SiO_2$.

The terms "unreacted periclase" and "unreacted chrome" are used to distinguish the grains of these materials used in the brick batch of this invention from the finely divided forms of these same, or similar, materials used to make the prereacted grain.

The magnesia grain, chrome ore grain, and prereacted grain used to make a refractory shape will be sized according to well known brickmaking practice to achieve the maximum pressed density. In other words, the grain sizing will vary from relatively coarse, for example passing a 4 mesh screen, down to particles passing a 325 mesh screen. While, as illustrated by the examples below, great variation in the sizing of the various components of the brick mix is possible, it will generally be found that in the highest strength brick the prereacted grain is of the coarsest sizing, for example passing a 4 mesh screen and retained on a 48 mesh screen, the unreacted chrome ore, particularly when it is a chrome concentrate, will be of intermediate sizing, for example passing a 10 mesh screen and retained on a 100 mesh screen, while the magnesia grain material will be of the finest sizing, for example substantially all passing a 48 mesh screen. Obviously there can be an overlap in the size ranges of the three grain materials.

One advantage of this preferred sizing is that it minimizes the necessity for using coarse chrome ore material. The prereacted grain itself is, of course, made from finely divided chrome ore material, whereas the chrome ore grain used in the brick mix need not be of the coarsest sizing.

The brick mix will contain a temporary binder to impart green strength to the pressed but unfired brick. In addition, the brick mix may contain minor amounts of other materials, such as sintering aids, well known in the art. The brick mix is formed into shape, for example by pressing, and fired to a temperature of at least 1,600°C, preferably to a temperature of at least 1700°C.

EXAMPLES

Table I sets forth the compositions and properties of a variety of compositions according to the present invention, illustrating the use of different types, as well as amounts, of prereacted grains, unreacted periclase and unreacted chrome ore. The "Nominal Per Cent MgO" is given for each specimen to indicate its general type, it being conventional in the refractories industry to classify magnesia-chrome or chrome-magnesia brick according to their total overall percentage of MgO.

Prereacted grain SPM was made admixing magnesium hydroxide produced from sea water with finely divided (90 percent −325 mesh) Masinloc chrome ore concentrates (Type MC chrome ore) in amounts to yield about 60% MgO in the fired product, the wet admixture being fed to a rotary kiln where it was fired to a temperature of about 2,000°C. The grain showed the following typical chemical analysis: 62.2% MgO, 0.7% CaO, 1.6% $SiO_2$, 12.8% $Al_2O_3$, 7.1% $Fe_2O_3$ and 15.6% $Cr_2O_3$.

Prereacted grain DPM was made from the same raw materials as grain SPM and in the same proportion. However, the magnesium hydroxide was calcined at about 1,000°C prior to mixing with the chrome, and the admixture was compacted prior to firing.

Prereacted grain DPT was made from calcined magnesia and finely divided Transvaal chrome concentrates in proportions to yield about 80% MgO in the reacted grain. The admixture was compacted before being fired at a temperature of about 1,800°C. The reacted grain showed the following chemical analysis: 1.3% $SiO_2$, 6.1% $Fe_2O_3$, 5.6% $Al_2O_3$, 10.4% $Cr_2O_3$, 0.9% CaO, and (by difference) 75.7% MgO.

Type G periclase was a sea water periclase of the following typical chemical analysis: 1.1% CaO, 2.1% $SiO_2$, 0.3% $Al_2O_3$, 0.4% $Fe_2O_3$, 0.3% $Cr_2O_3$, and (by difference) 95.8% MgO. It was made by firing magnesium hydroxide in a rotary kiln.

Type K periclase was a high purity periclase made by the so-called "double burn" process with briquetting between the calcination and firing steps. It had a typical chemical analysis as follows: 1.0% CaO, 0.3% $SiO_2$, 0.1% $Al_2O_3$, 0.2% $Fe_2O_3$, 0.2% $Cr_2O_3$ (by difference) 98.2% MgO.

Type MC chrome ore was a beneficiated Masinloc chrome ore having the following typical chemical anal-

TABLE I

| Specimen number | 1 | 2 | 3 | 4 | 5 | 6 | 7 | 8 | 9 | 10 | 11 | 12 | 13 |
|---|---|---|---|---|---|---|---|---|---|---|---|---|---|
| Nominal percent MgO | 40 | 50 | 50 | 50 | 60 | 60 | 60 | 60 | 60 | 60 | 70 | 80 | 80 |
| Prereacted grain: | | | | | | | | | | | | | |
| Type | SPM | DPM | DPM | SPM | SPM | SPM | DPM | SPM | DPM | SPM | DPM | DPT | SPM |
| Amount (wt. percent) | 55 | 81 | 24 | 40.5 | 70 | 60 | 50 | 42 | 42 | 30 | 70 | 70 | 43 |
| Sizing: | | | | | | | | | | | | | |
| +28 | 54 | 64 | 100 | 72 | 77 | 75 | 99 | 75 | 100 | 99.7 | 87 | 87 | 76 |
| 28×100 | 2 | 7 | | 4 | 22 | 9 | 1 | 1 | | 0.3 | 13 | 13 | |
| −100 | 44 | 29 | | 24 | 1 | 16 | | 24 | | | | | 24 |
| Periclase: | | | | | | | | | | | | | |
| Type | | | G | G | G | K | K | G | G | G | K | K | G |
| Amount (wt. percent) | | | 31.5 | 20.5 | 18 | 23 | 30 | 33.5 | 34 | 41 | 30 | 20 | 57 |
| Sizing: | | | | | | | | | | | | | |
| +28 | | | | | | 0 | | 37 | | 17 | | | 40 |
| 28×100 | | | 2 | 2 | 1 | 1 | 2 | 2 | 3 | 0.5 | 2 | | |
| −100 | | | 98 | 98 | 99 | 99 | 98 | 61 | 97 | 82.5 | 98 | 100 | 36 |
| Chrome ore: | | | | | | | | | | | | | |
| Type | MC | MC | MC | MC | TC | MC | TC | MC | MC | MC | | MC | |
| Amount (wt. percent) | 45 | 19 | 44.5 | 39 | 12 | 17 | 20 | 24.5 | 24 | 29 | | 10 | |
| Sizing: | | | | | | | | | | | | | |
| +28 | 47 | 23 | 47 | 46 | | 99 | 3 | 35 | 34 | 35 | | | |
| 28×100 | 49 | 68 | 48 | 49 | | 1 | 87 | 58 | 59 | 61 | | | |
| −100 | 4 | 9 | 5 | 5 | 100 | | 10 | 7 | 7 | 4 | | 100 | |
| Density (p.c.f.): | | | | | | | | | | | | | |
| Pressed | 208 | 201 | 204 | 201 | 200 | 199 | 204 | 201 | 202 | 200 | 194 | 196 | 191 |
| Dried | 204 | 197 | 200 | 200 | 196 | 194 | 200 | 197 | 199 | 197 | 191 | 191 | 187 |
| Fired | 202 | 198 | 199 | 196 | 196 | 192 | 199 | 193 | 194 | 194 | 191 | 191 | 191 |
| Porosity (vol. percent) | 16.3 | 16.8 | 16.4 | 17.0 | 15.9 | 17.2 | 16.7 | 16.7 | 16.4 | 16.6 | 16.7 | 15.4 | 15.9 |
| Shrinkage (percent): | | | | | | | | | | | | | |
| Linear | 0.6 | 0.9 | 0.8 | 0.6 | 0.9 | 0.7 | 0.6 | 0.6 | 0.4 | 0.8 | 0.9 | 1.2 | 1.5 |
| Volume | 0.7 | 1.9 | 1.2 | 0.6 | 1.9 | 1.1 | 0.5 | 0.5 | 0.3 | 1.1 | 1.8 | 3.1 | 3.6 |
| MOR (p.s.i.): | | | | | | | | | | | | | |
| 1,260° C | 2,431 | 1,942 | 2,682 | | 2,741 | 2,249 | 2,498 | 2,498 | 2,608 | 3,225 | 2,463 | a 245 | 1,657 |
| 1,482° C | 766 | 610 | 876 | 800 | 868 | 778 | 1,226 | 1,226 | 1,178 | 1,685 | 552 | b 130 | 286 | a At 1,400° C.   b At 1,500° C.

ysis: 18.7% MgO, 0.4% CaO, 2.6% $SiO_2$, 29.4% $Al_2O_3$, 13.9% FeO and 35.0% $Cr_2O_3$.

Type TC chrome ore was a beneficiated Transvaal chrome ore of the following typical chemical analysis: 11.0% MgO, 0.1% CaO, 0.6% $SiO_2$, 14.7% $Al_2O_3$, 28.5% $Fe_2O_3$ and 45.1% $Cr_2O_3$.

The numbers given for the sizings of the various fractions of materials are weight per cent based on 100 percent of the particular material involved. The weight percentages given for each of the grain materials in the brick batch is based on the total weight of grain in the batch, and does not take into consideration 2 percent of a temporary lignosulfonate binder used in all batches and 0.5% $ZrO_2$ used in batches 6, 7, 8 and 10 as a sintering aid.

Each of the batches was pressed into bricks 9 × 4½ × 3 inches under a pressure of 10,000 psi, dried at 150°C and fired to 1,750°C. Although the properties given in Table I are for brick fired to 1,750°C, compositions within the scope of this invention have been fired at even lower temperatures, for example 1350 and 1,400°C, producing fired brick of good properties.

Fired density and apparent porosity were determined by ASTM method C-20-70.

Hot strength was determined by measuring, at the temperatures indicated in Table I, the modulus of rupture (MOR) of 1 inch × 1 inch × 6 inch bars cut from fired brick.

The firing shrinkages of Specimens 8 and 9 can be compared with that of brick of the same overall composition but made entirely of prereacted grain (and $Al_2O_3$) according to the teachings of U.S. Pat. No. 3,577,246. This latter brick had 1.5 percent linear and 4.1 percent volume shrinkage.

From the examples, it will be seen that in most cases at least 75 percent of the prereacted grain is of +28 mesh sizing, that at least 90 percent of the unreacted periclase is −100 mesh, and that the 28 × 100 mesh fraction of the unreacted chrome ore constitutes at least 45 percent of the chrome ore and is present in greater amount than the +28 or −100 chrome fractions. Specimens 3, 7, and 9 illustrate the preferred embodiment of the present invention wherein all three of the preceding sizing conditions on the three grains are met. In this regard the superior strengths, and lower firing shrinkage of Specimen 3, containing all three grains may be compared with those of Specimen 2, also containing an overall MgO content of 50 percent, but containing no unreacted periclase. This comparison indicates the advantage of having both chrome ore grain and magnesia grain together with the prereacted grain.

It has been found that the commercially most useful compositions contain between 50 percent and 70 percent total MgO, for example as illustrated by Specimens 2 through 11, particularly about 60% total MgO, as exemplified by Specimens 5 through 10. By the term "total MgO" is meant the amount of MgO determined by chemical analysis of a fired brick or the amount calculated from the total composition of a brick batch.

As can be seen from the examples, it is preferred that the compositions of this invention contain at least 15 percent unreacted periclase, at least 10 percent unreacted chrome, and up to 75 percent prereacted grain.

Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns, and 200 mesh to 74 microns. Analyses of mineral components are reported in the usual manner, expressed as simple oxides, e.g., MgO, $SiO_2$, although the components may actually be present in various combinations, e.g., as a magnesium silicate.

What is claimed is:

1. A refractory composition consisting essentially of from about 20 percent to about 80 percent prereacted grain, the balance being from 0 percent to 55 percent unreacted periclase and from 0 percent to 55 percent unreacted chrome ore, said prereacted grain being a sintered admixture of from 20 percent to 80 percent magnesia and from 80 percent to 20 percent chrome ore, both materials substantially entirely passing a 100 mesh screen and at least 90 percent of each of them passing a 325 mesh screen, the sintered grain being substantially free of any unreacted chrome particles, all percentages being by weight.

2. A fired refractory shape made from the composition of claim 1.

3. Fired refractory shape according to claim 2 fired at a temperature of at least 1,600°C.

4. Composition according to claim 1 wherein the unreacted chrome ore is beneficiated chrome ore containing less than 3% $SiO_2$.

5. Composition according to claim 1 and containing at least 15 percent unreacted periclase, at least 10 percent unreacted chrome ore, and up to 75 percent prereacted grain.

6. Fired refractory shape made from the composition of claim 5.

7. Fired refractory shape according to claim 6 fired at a temperature of at least 1,600°C.

8. Composition according to claim 5 wherein the unreacted chrome ore is beneficiated chrome ore containing less than 3% $SiO_2$.

9. Composition according to claim 5 wherein at least 75 percent of the prereacted grain is retained on a 28 mesh screen, wherein at least 90 percent of the unreacted periclase passes a 100 mesh screen, and wherein at least 45 percent of the unreacted chrome ore passes a 28 mesh screen and is retained on a 100 mesh screen, the amount of 28 × 100 mesh unreacted chrome ore exceeding the amount of that material retained on a 28 mesh screen and the amount passing a 100 mesh screen.

10. Composition according to claim 9 wherein the unreacted chrome ore is beneficiated chrome ore containing less than 3% $SiO_2$.

11. Fired refractory shape made from the composition of claim 9.

12. Fired refractory shape according to claim 11 fired at a temperature of at least 1,600°C.

13. Fired refractory shape according to claim 12 wherein the brick contains from 50 percent to 70 percent total MgO.

14. Fired refractory shape according to claim 13 wherein the brick contains about 60% MgO.

15. Fired refractory shape according to claim 14 wherein the unreacted chrome ore is beneficiated chrome ore containing less than 3% $SiO_2$.

* * * * *